US012777398B2

(12) United States Patent
Lee

(10) Patent No.: US 12,777,398 B2
(45) Date of Patent: Oct. 27, 2026

(54) CHO AND HO TIMING COLLISION

(71) Applicant: MEDIATEK INC., Hsinchu (TW)

(72) Inventor: Tsung-Ming Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 306 days.

(21) Appl. No.: 18/376,463

(22) Filed: Oct. 4, 2023

(65) Prior Publication Data

US 2024/0137831 A1 Apr. 25, 2024
US 2024/0236804 A9 Jul. 11, 2024

Related U.S. Application Data

(60) Provisional application No. 63/417,708, filed on Oct. 20, 2022.

(51) Int. Cl.
*H04W 36/36* (2009.01)
*H04W 36/06* (2009.01)

(52) U.S. Cl.
CPC ......... *H04W 36/362* (2023.05); *H04W 36/06* (2013.01)

(58) Field of Classification Search
CPC ... H04W 36/362; H04W 36/16; H04W 36/30; H04W 36/06; H04W 36/24; H04W 36/36; H04W 36/0055
See application file for complete search history.

(56) References Cited

U.S. PATENT DOCUMENTS

| | | | | |
|---|---|---|---|---|
| 2014/0126545 | A1* | 5/2014 | Tamura | H04W 36/36 370/332 |
| 2019/0223073 | A1* | 7/2019 | Chen | H04W 36/305 |
| 2021/0243667 | A1* | 8/2021 | Awada | H04W 36/362 |
| 2022/0014985 | A1* | 1/2022 | Da Silva | H04W 36/00838 |
| 2022/0046502 | A1* | 2/2022 | Chen | H04W 36/00837 |
| 2022/0150780 | A1* | 5/2022 | Chen | H04W 36/305 |
| 2022/0264401 | A1* | 8/2022 | Yan | H04W 76/18 |

* cited by examiner

*Primary Examiner* — Mohamed A Kamara
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The UE receives, from a source cell, a conditional handover (CHO) command configuring the UE to perform a CHO procedure to handover to a target cell in response to satisfying a CHO condition. The UE receives, from the source cell after receiving the CHO command, a handover (HO) command configuring the UE to perform a HO procedure to handover to the target cell. The UE determines whether the UE has started the CHO procedure prior to receiving the HO command. The UE, in response to determining that the UE has started the CHO procedure prior to receiving the HO command, discards the HO command and continues with the CHO procedure.

12 Claims, 9 Drawing Sheets

CHO AND HO TIMING COLLISION

CROSS-REFERENCE TO RELATED APPLICATION(S)

This application claims the benefits of U.S. Provisional Application Ser. No. 63/417,708, entitled “CHO AND HO TIMING COLLISION” and filed on Oct. 20, 2022, which is expressly incorporated by reference herein in its entirety.

BACKGROUND

Field

The present disclosure relates generally to communication systems, and more particularly, to techniques of handling a collision between a conditional handover procedure and a regular handover procedure.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The UE receives, from a source cell, a conditional handover (CHO) command configuring the UE to perform a CHO procedure to handover to a target cell in response to satisfying a CHO condition. The UE receives, from the source cell after receiving the CHO command, a handover (HO) command configuring the UE to perform a HO procedure to handover to the target cell. The UE determines whether the UE has started the CHO procedure prior to receiving the HO command. The UE, in response to determining that the UE has started the CHO procedure prior to receiving the HO command, discards the HO command and continues with the CHO procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
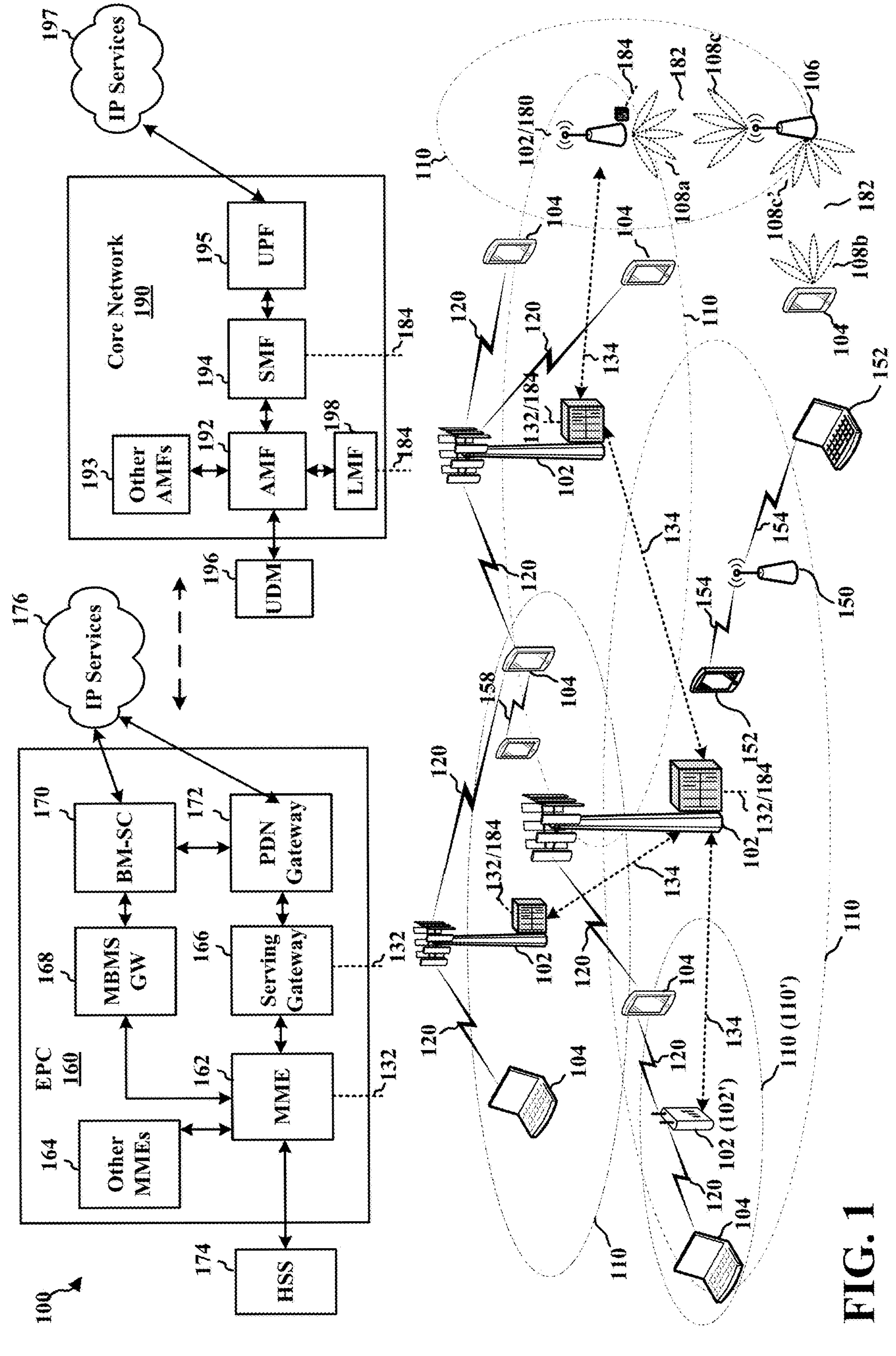
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as “elements”). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
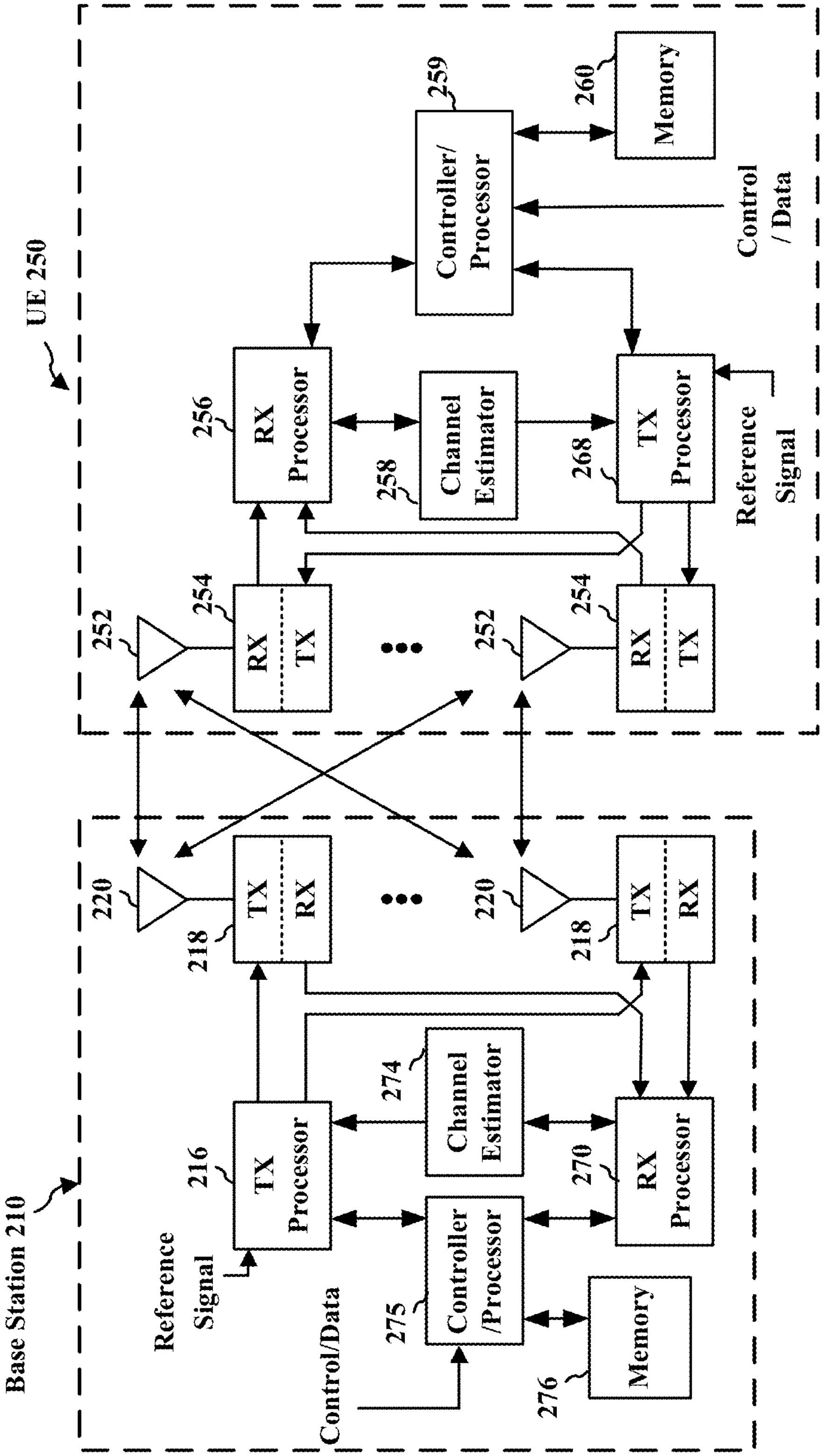
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
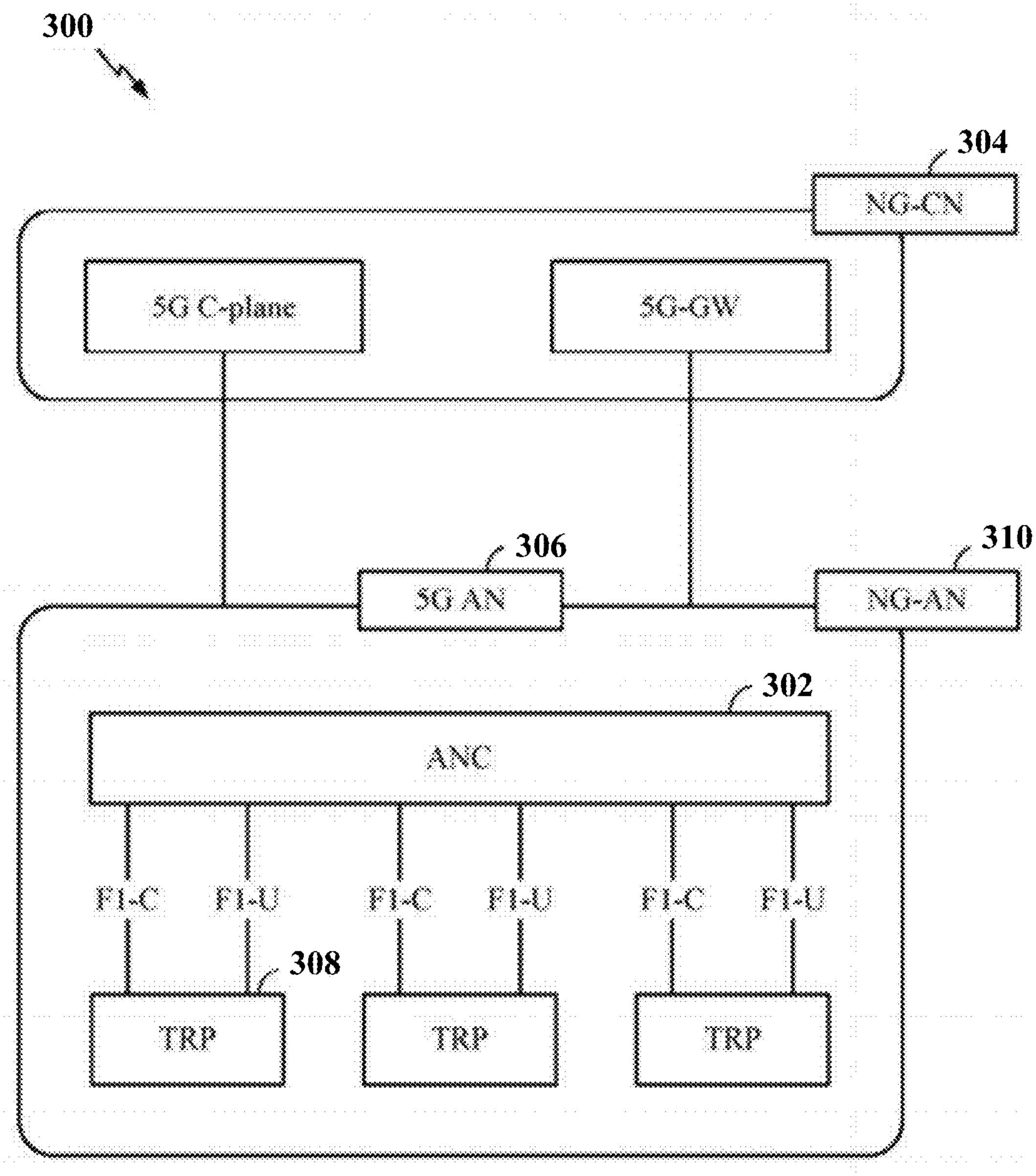
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
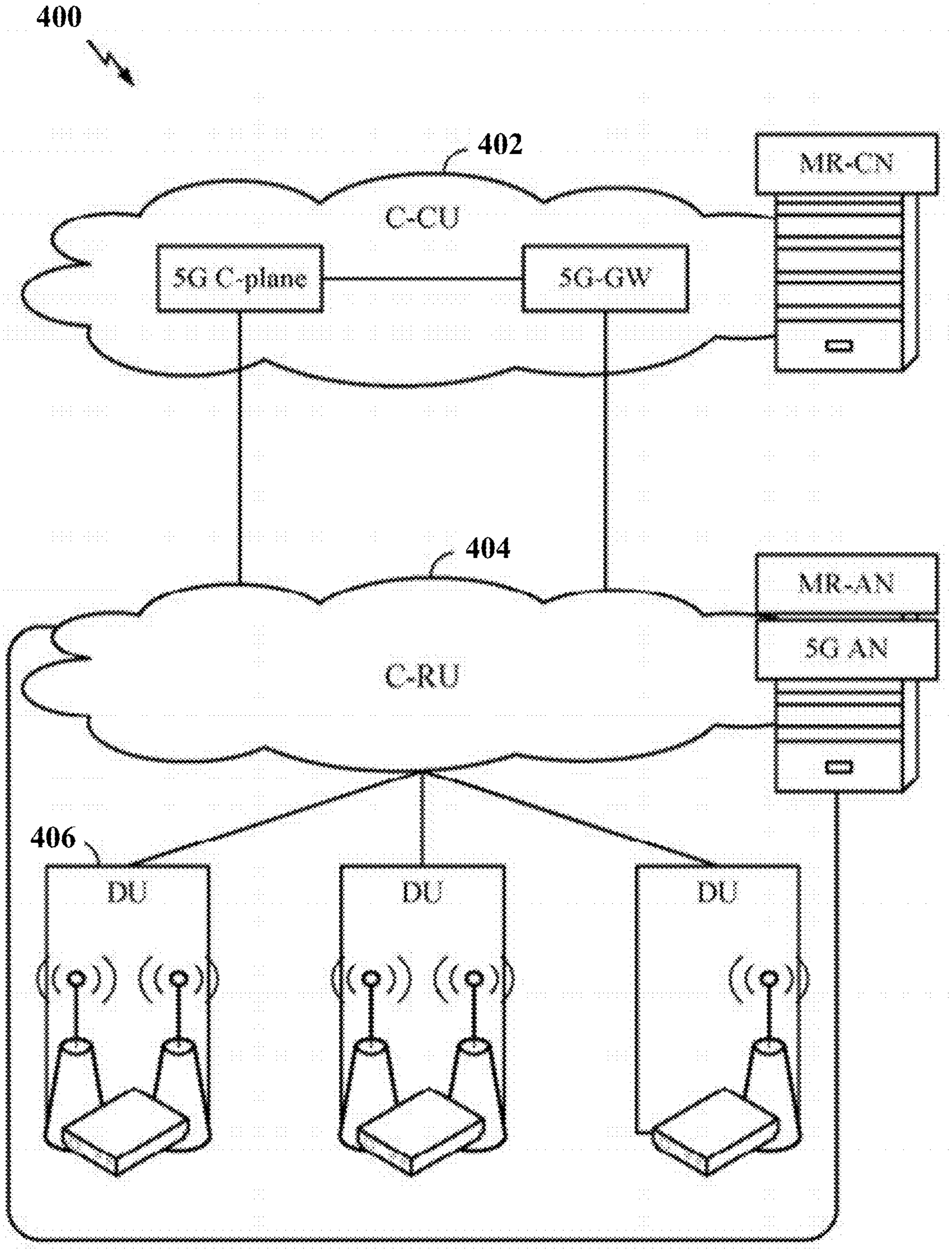
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
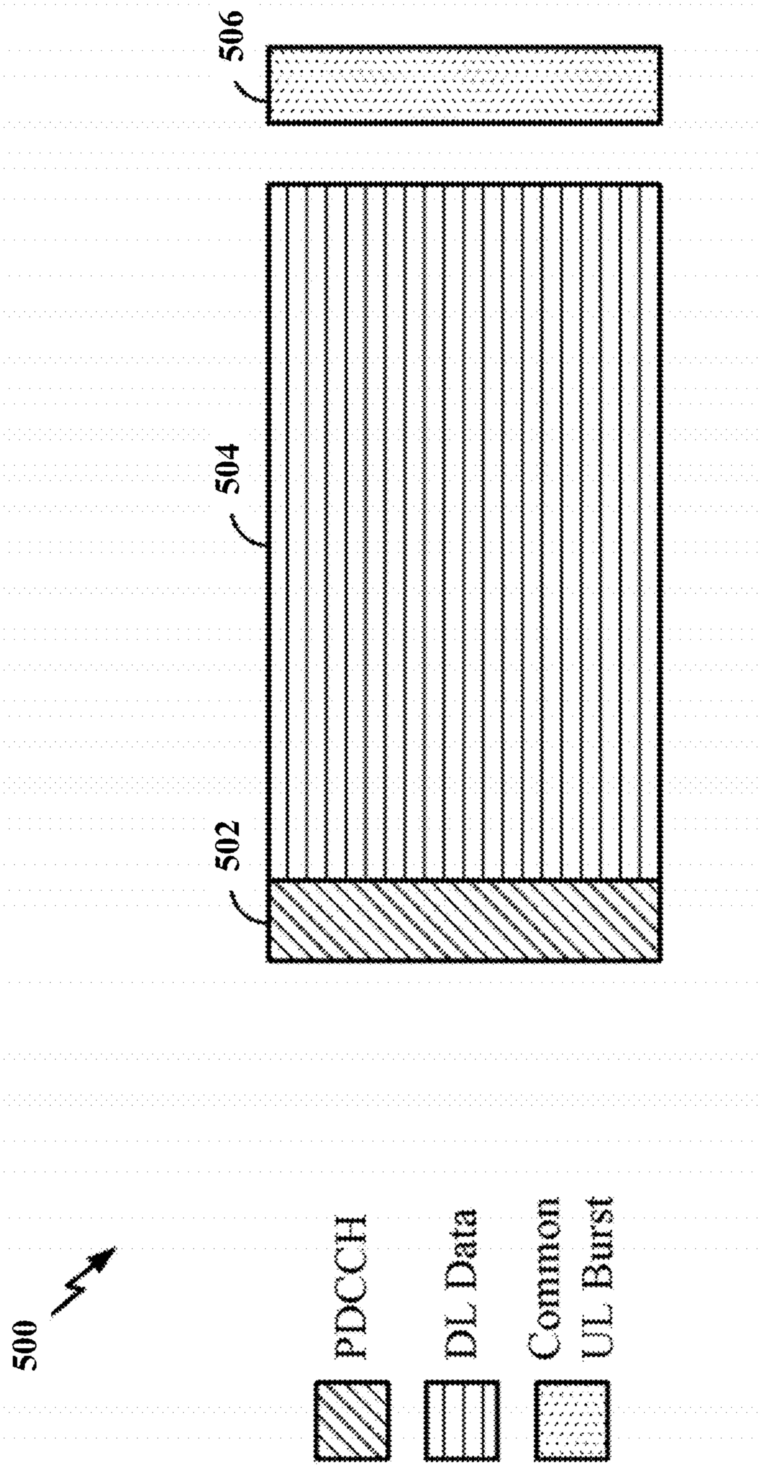
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
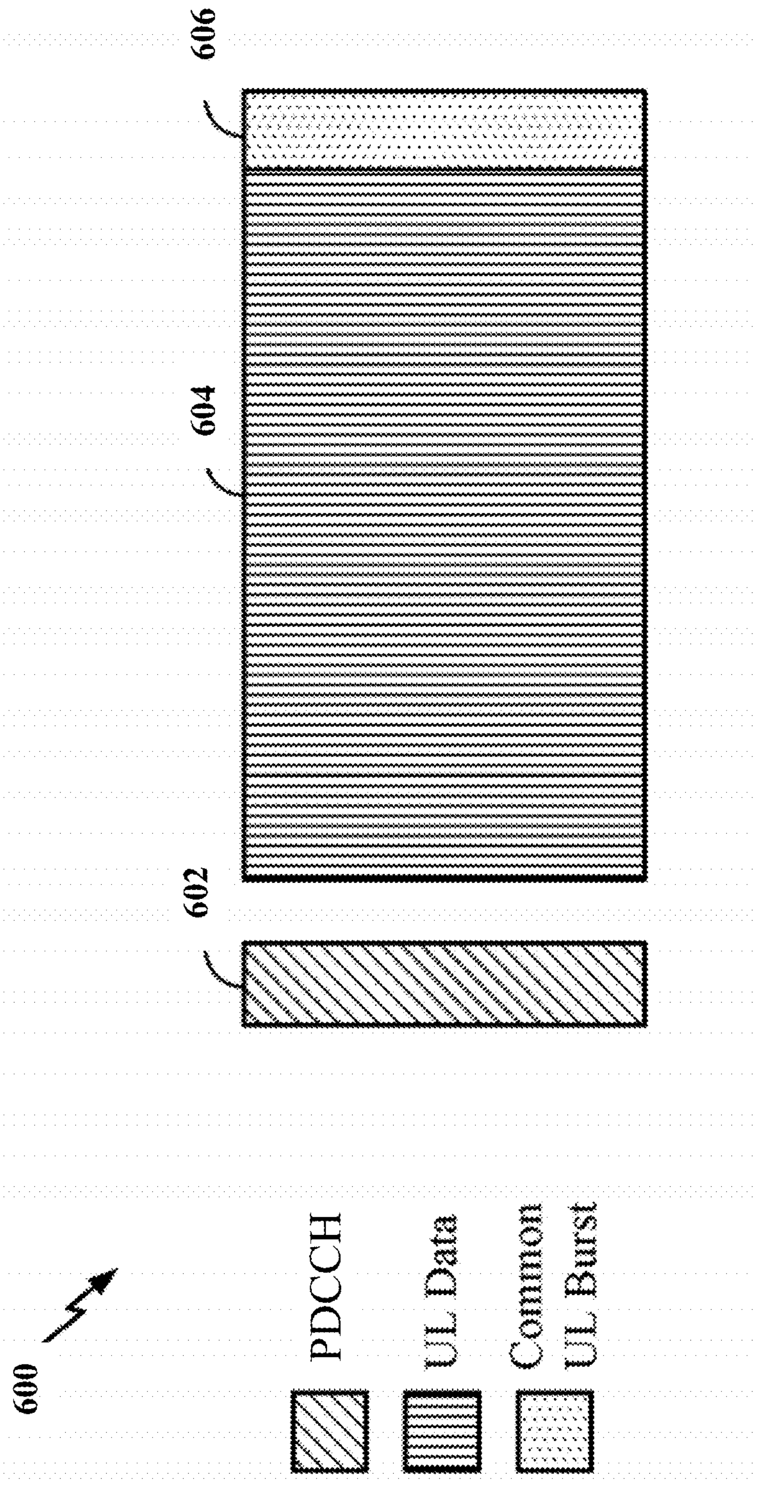
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
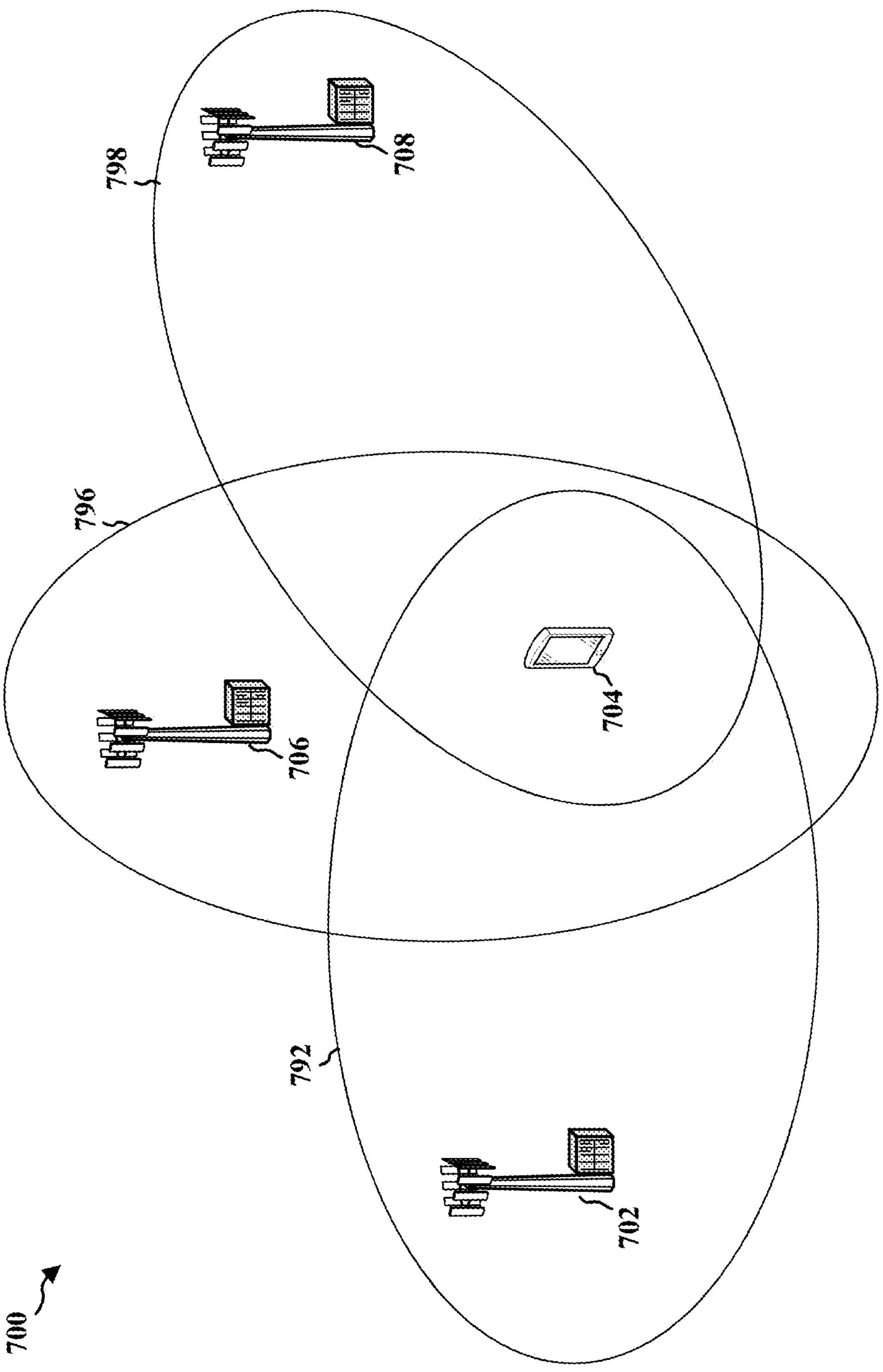
FIG. 7 is a diagram illustrating a scenario where a UE may be handed over from one base station to another base station.

FIG. 7 is a diagram 700 illustrating a scenario where a UE may be handed over from one base station to another base station. In this example, a UE 704 is connected to a cell 792 of a base station. Further, the UE 704 is also under the coverage of a cell 796 of a base station 706 and the coverage of a cell 798 of a base station 708. The base station 702 may configure the UE 704 to measure signals of the cell 796 and the cell 798 and reports the measurements to the base station 702. The base station 702 may use a conditional handover (CHO) procedure or a regular handover (HO) procedure to handover the UE 704 to the base station 706 or the base station 708 when certain conditions are met.

In a conditional handover (CHO), the base station configures the UE to evaluate certain candidate cells and measure their signal strengths (e.g. RSRP). The UE sends measurement reports about the candidate cells to the base station. These are different from regular measurement reports.

Based on the reports, the base station requests CHO configurations from suitable candidate cells. The candidate cells respond with CHO configurations containing details such as dedicated resources. The base station sends the UE a CHO configuration with candidate cells and trigger conditions.

The UE starts evaluating the trigger conditions. When met, the UE executes a handover to the target cell using the dedicated resources. The UE may stop evaluating conditions once any handover occurs, either the CHO or a regular HO.

CHO allows the handover to be prepared in advance and executed autonomously by the UE when conditions are met. This improves the speed and reliability compared to regular handover which requires more signaling.

Figure 8:
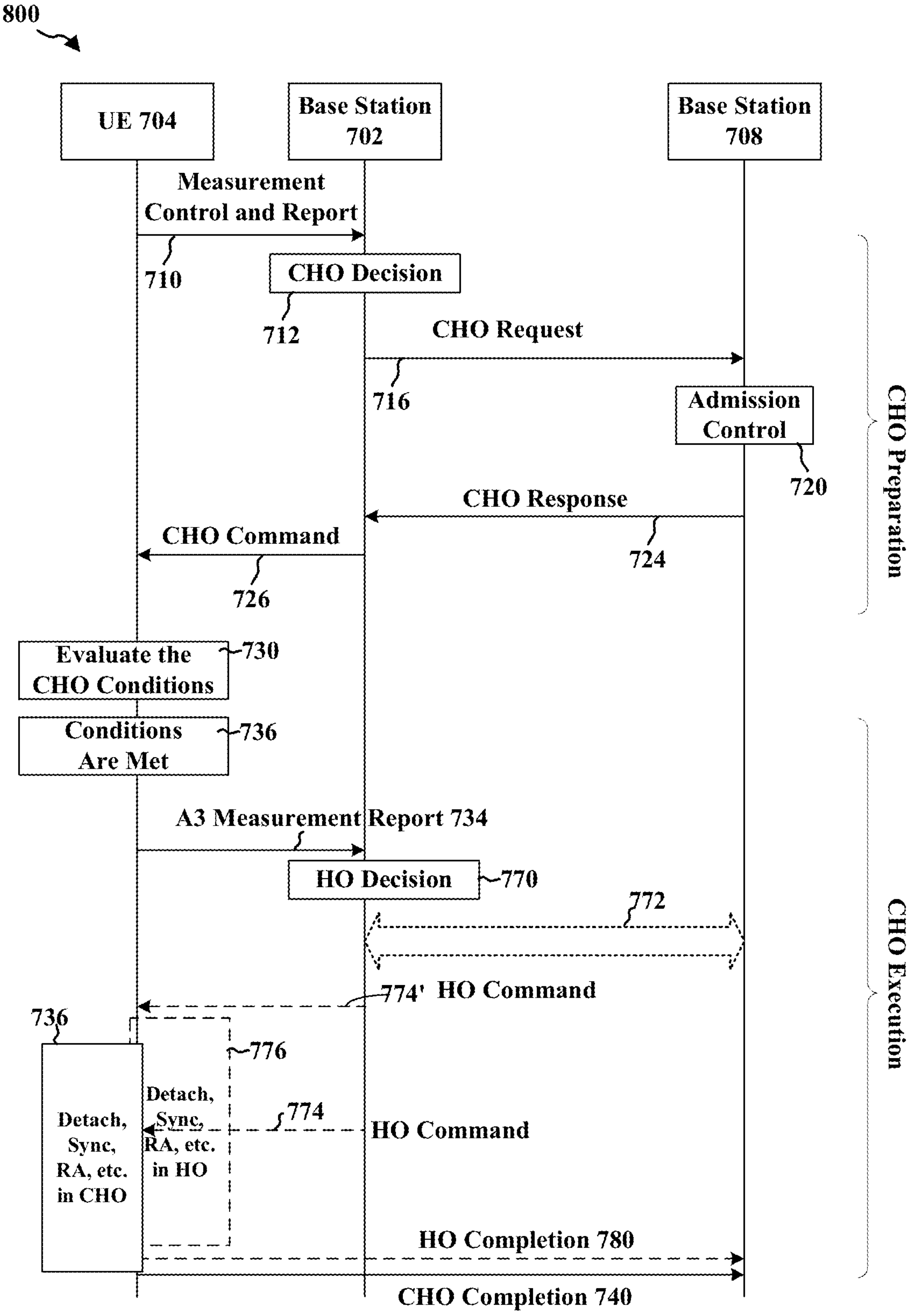
FIG. 8 is a diagram illustrating a conditional handover (CHO) procedure.

FIG. 8 is a diagram 800 illustrating a conditional handover (CHO) procedure. In this example, the base station 702 configures the UE 704 to measure signals from the cell 796 and the cell 798. The UE 704 then sends a measurement report 710 to the base station 702, which includes measurements of the signals of the cell 796 and the cell 798 according to the measurement configuration. Based on the measurement report and RRM information, the base station 702 makes a decision 712 to configure CHO with the cell 798 of the base station 708 for the UE 704.

The base station 702 sends CHO request messages 716 to the candidate base station 708 for cell 798. The candidate base station 708 may perform admission control 720. The base station 708 may decide to allow the CHO and send a CHO response 724 to the base station 702, including the configuration details of candidate cell 798 for a handover.

The base station 702 sends a CHO command 726 to the UE 704, containing the configuration of the CHO candidate cells and execution conditions. In general, a CHO command may be an RRCReconfiguration message. The CHO command provides the UE all the necessary information regarding which cells are candidates, how to measure/evaluate them, which resources to use, target cell configuration, security context etc. This allows the UE to autonomously execute the conditional handover when the triggers are met. In this example, the CHO command 726 may include identity of the candidate target cell 798 for CHO. The trigger condition(s) to execute CHO, such as RSRP/RSRQ thresholds. The CHO command 726 may include measurement configuration for the candidate cell 798 such as reference signals. The CHO command 726 may include dedicated CHO resources allocated at the candidate target cell 798 such as an RA-RNTI.

The UE 704 may acknowledge the CHO command 726 by sending an RRCReconfigurationComplete message to the base station 702. At this point, the CHO preparation has been completed.

The UE 704 executes the CHO when certain conditions are met. For example, the conditions may include a conditional A3 event. The event A3 is triggered when a candidate cell becomes better RSRP strength than the serving cell by an offset within time to trigger period. The offset can be either positive or negative. The event is triggered when the following condition is true:

$$M_n+O_{fn}+O_{cn}-Hys>M_p+O_{fp}+O_{cp}+Off,$$

where, $M_n$ is the measurement result of the neighbouring cell, not taking into account any offsets, $O_{fn}$ is the measurement object specific offset of the reference signal of the neighbour cell, $O_{cn}$ is the cell specific offset of the neighbour cell, and set to zero if not configured for the neighbour cell, $M_p$ is the measurement result of the serving cell, not taking into account any offsets, $O_{fp}$ is the measurement object specific offset of the serving cell, $O_{cp}$ is the cell specific offset of the serving cell, and is set to zero if not configured for the serving cell, Hys is the hysteresis parameter for this event, and Off is the offset parameter for this event. $M_n$, $M_p$ are expressed in dBm in case of RSRP, or in dB in case of RSRQ and RS-SINR, and $O_{fn}$, $O_{cn}$, $O_{fp}$, $O_{cp}$, Hys, Off are expressed in dB.

In another example, the condition may include a conditional A5 event. An A5 event relates to the serving cell becoming worse than a threshold while a neighbor becomes better than another threshold. The A3, A5 events and other relevant events are defined in "3GPP TS 38.331 V17.2.0 (2022-09); 3rd Generation Partnership Project; Technical Specification Group Radio Access Network; NR; Radio Resource Control (RRC) protocol specification (Release 17)," which is expressly incorporated by reference herein in its entirety.

The UE 704 maintains the connection with the base station 702 after receiving the CHO configurations, and starts evaluating the CHO execution conditions for the candidate cell(s) in an evaluation procedure 730. The UE 704 subsequently determines that an A3 event 732 with respect to the cell 798 occurs. The A3 event triggers the CHO execution. In addition, the A3 event also triggers a regular HO procedure. The A3 event is an example here. Other events triggering both the CHO execution and a HO procedure may replace the A3 event.

According to the regular HO procedure, the UE 704 then sends an A3 measurement report 734 to the base station 702 to trigger preparation for a regular handover. At or around the same time, in procedures 736, the UE 704 also starts executing the CHO by detaching from the base station 702, applying the configurations for the cell 798, synchronizing to the cell 798, and starting a random access procedure with the cell 798 according the configurations stored at the UE 704 and originally from the CHO command 726.

After the UE 704 completes the CHO execution, the UE 704 sends a CHO completion message 740 (e.g., a RRCReconfigurationComplete message) to the base station 708. The UE 704 may discard any stored CHO configurations after successfully completing the CHO procedure.

On the other hand, after receiving the A3 measurement report 734, the base station 702 decides, in a HO decision procedure 770, whether to handover the UE 704 based on A3 measurement report 734 and RRM information. Subsequently, when the base station 702 decides to handover, the base station 702 communicates with the base station 708 for regular HO preparation procedures 772. After the regular HO preparation procedure is completed, the base station 702 triggers the regular HO by sending a regular HO command 774/774' to the UE 704, containing the information required to access the cell 798.

When the UE receives a HO command 774 after the procedures 736 have started, the UE 704 may choose to discard/ignore the regular HO command 738 and continues with the CHO execution to complete handover to the target cell 798. After successful completion of the RRC handover procedure, the UE 704 releases any stored CHO configurations.

When the UE receives a HO command 774' and the procedures 736 have not been started, the UE 704 may choose to discard execution of the procedures 736 and start execution of procedures 776 for a regular HO according to the HO command 774'. In procedures 776, the UE 704 detaches from the base station 702, applying the configuration for the cell 798, synchronizing to the cell 798, and starting a random access procedure with the cell 798 according to the configurations from the HO command 774'. After the UE 704 completes the HO execution, the UE 704 sends a HO completion message 780 (e.g., a RRCReconfigurationComplete message) to the base station 708.

Figure 9:
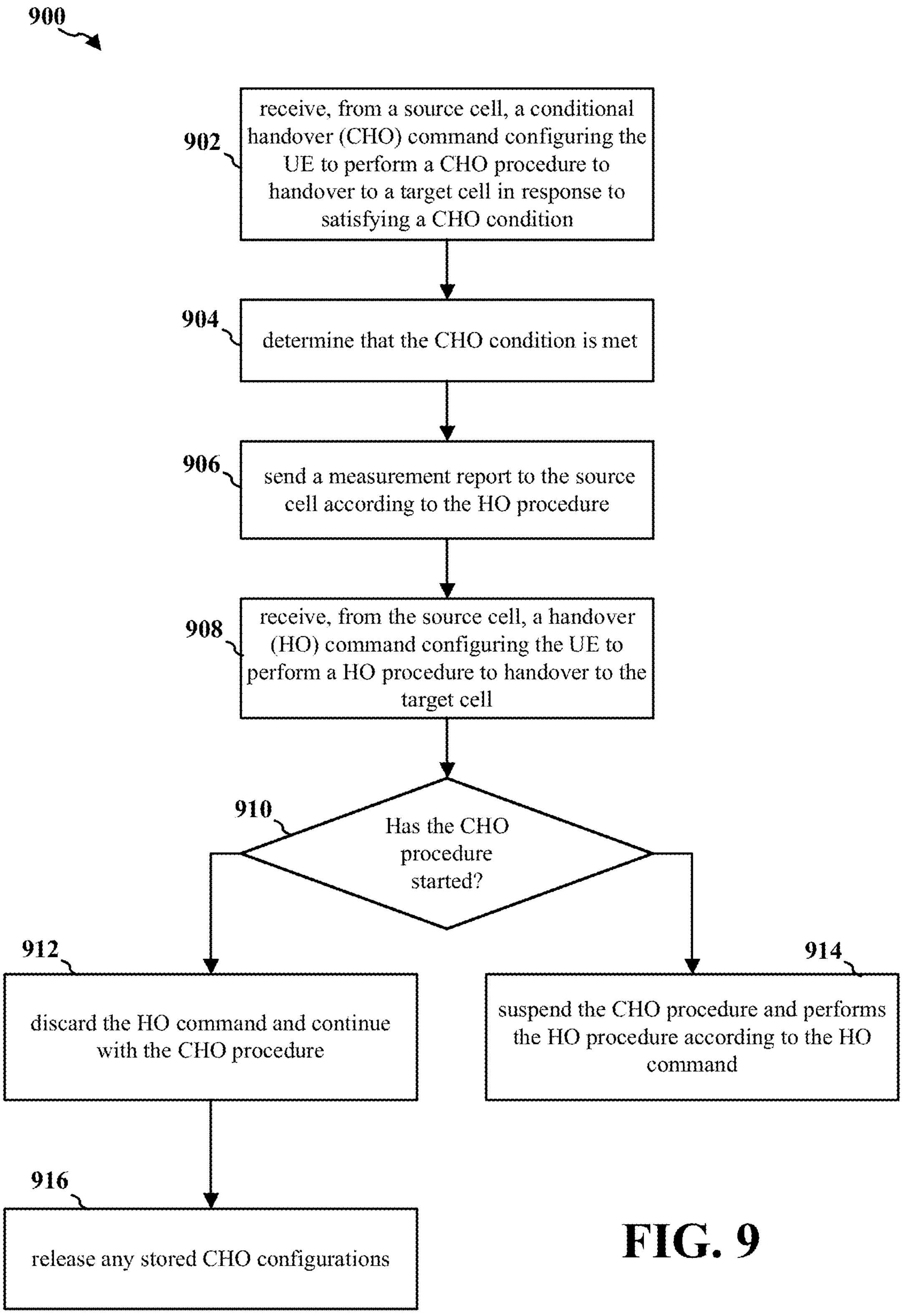
FIG. 9 is a flow chart of a method (process) for handling a timing collision between a CHO procedure and a HO procedure

FIG. 9 is a flow chart 900 of a method (process) for handling a timing collision between a CHO procedure and a HO procedure. The method may be performed by a UE (e.g., the UE 704, the UE 250). In operation 902, the UE receives, from a source cell, a conditional handover (CHO) command configuring the UE to perform a CHO procedure to handover to a target cell in response to satisfying a CHO condition. In operation 904, the UE determines that the CHO condition is met. The UE starts the CHO procedure subsequently. The CHO condition may include a conditional handover event based on that a signal strength of the target cell is better than that of the source cell by an offset. In operation 906, the UE sends a measurement report to the source cell according to a HO procedure. In operation 908, the UE receives, from the source cell, a handover (HO) command configuring the UE to perform the HO procedure to handover to the target cell.

In operation 910, the UE determines whether it has started the CHO procedure prior to receiving the HO command. To determine whether the UE has started the CHO procedure, the UE determines whether it has started detaching from the source cell, synchronizing with the target cell, and/or starting a random access procedure with the target cell.

If the UE determines in operation 910 that it has started the CHO procedure prior to receiving the HO command, then in operation 912, the UE discards the HO command and continues with the CHO procedure. In operation 916, after successfully completing the CHO procedure, the UE releases any stored CHO configurations. If the UE determines in operation 910 that it has not started the CHO procedure prior to receiving the HO command, then in operation 914, the UE suspends the CHO procedure and performs the HO procedure according to the HO command.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, from a source cell, a conditional handover (CHO) command configuring the UE to perform a CHO procedure to handover to a target cell in response to satisfying a CHO condition;

starting the CHO procedure in response to determining that the CHO condition is met, wherein the CHO condition also triggers the UE to send a measurement report to the source cell according to a regular handover (HO) procedure;

sending the measurement report to the source cell;

receiving, from the source cell after receiving the CHO command and after sending the measurement report, a regular HO command configuring the UE to perform the regular HO procedure to handover to the target cell, wherein the regular HO command is received from the source cell in response to the measurement report;

determining whether the UE has started execution of the CHO procedure prior to receiving the regular HO command, wherein determining whether the UE has started execution of the CHO procedure comprises determining at least one of: whether the UE has started detaching from the source cell, whether the UE has started synchronizing with the target cell, or whether the UE has started a random access procedure with the target cell; and in response to determining that the UE has started execution of the CHO procedure prior to receiving the regular HO command, discarding the regular HO command and continuing with the CHO procedure to complete handover to the target cell.

2. The method of claim 1, further comprising:

in response to determining that the UE has not started execution of the CHO procedure prior to receiving the regular HO command, suspending the CHO procedure and performing the regular HO procedure according to the regular HO command.

3. The method of claim 1, further comprising:

releasing any stored CHO configurations after successfully completing the CHO procedure.

4. The method of claim 1, wherein the CHO condition comprises a conditional handover event based on determining that a signal strength of the target cell is better than that of the source cell by an offset.

5. An apparatus for wireless communication, the apparatus being a user equipment (UE), comprising:

a memory; and at least one processor coupled to the memory and configured to:

receive, from a source cell, a conditional handover (CHO) command configuring the UE to perform a CHO procedure to handover to a target cell in response to satisfying a CHO condition;

start the CHO procedure in response to determining that the CHO condition is met, wherein the CHO condition also triggers the UE to send a measurement report to the source cell according to a regular handover (HO) procedure;

send the measurement report to the source cell;

receive, from the source cell after receiving the CHO command and after sending the measurement report, a regular HO command configuring the UE to perform the regular HO procedure to handover to the target cell, wherein the regular HO command is received from the source cell in response to the measurement report;

determine whether the UE has started execution of the CHO procedure prior to receiving the regular HO command, wherein to determine whether the UE has started execution of the CHO procedure, the at least one processor is configured to determine at least one of: whether the UE has started detaching from the source cell, whether the UE has started synchronizing with the target cell, or whether the UE has started a random access procedure with the target cell; and in response to determining that the UE has started execution of the CHO procedure prior to receiving the regular HO command, discard the regular HO command and continue with the CHO procedure to complete handover to the target cell.

6. The apparatus of claim 5, wherein the at least one processor is further configured to:

in response to determining that the UE has not started execution of the CHO procedure prior to receiving the regular HO command, suspend the CHO procedure and perform the regular HO procedure according to the regular HO command.

7. The apparatus of claim 5, wherein the at least one processor is further configured to:

release any stored CHO configurations after successfully completing the CHO procedure.

8. The apparatus of claim 5, wherein the CHO condition comprises a conditional handover event based on determining that a signal strength of the target cell is better than that of the source cell by an offset.

9. A non-transitory computer-readable medium storing computer executable code for wireless communication of a user equipment (UE), comprising code to:

receive, from a source cell, a conditional handover (CHO) command configuring the UE to perform a CHO procedure to handover to a target cell in response to satisfying a CHO condition;

start the CHO procedure in response to determining that the CHO condition is met, wherein the CHO condition also triggers the UE to send a measurement report to the source cell according to a regular handover (HO) procedure;

send the measurement report to the source cell;

receive, from the source cell after receiving the CHO command and after sending the measurement report, a regular HO command configuring the UE to perform the regular HO procedure to handover to the target cell, wherein the regular HO command is received from the source cell in response to the measurement report;

determine whether the UE has started execution of the CHO procedure prior to receiving the regular HO command, wherein the code to determine whether the UE has started execution of the CHO procedure comprises code to determine at least one of: whether the UE has started detaching from the source cell, whether the UE has started synchronizing with the target cell, or whether the UE has started a random access procedure with the target cell; and in response to determining that the UE has started execution of the CHO procedure prior to receiving the regular HO command, discard the regular HO command and continue with the CHO procedure to complete handover to the target cell.

10. The non-transitory computer-readable medium of claim 9, further comprising code to:

in response to determining that the UE has not started execution of the CHO procedure prior to receiving the regular HO command, suspend the CHO procedure and perform the regular HO procedure according to the regular HO command.

11. The non-transitory computer-readable medium of claim 9, further comprising code to:

release any stored CHO configurations after successfully completing the CHO procedure.

12. The non-transitory computer-readable medium of claim 9, wherein the CHO condition comprises a conditional handover event based on determining that a signal strength of the target cell is better than that of the source cell by an offset.

* * * * *